United States Patent
Culf

(10) Patent No.: US 9,393,984 B2
(45) Date of Patent: Jul. 19, 2016

(54) UTILITY KNIFE BLADE

(71) Applicant: STANLEY BLACK & DECKER, INC., New Britain, CT (US)

(72) Inventor: Peter Geoffrey Culf, Rotherham (GB)

(73) Assignee: STANLEY BLACK & DECKER, INC., New Britain, CT (US)

( * ) Notice: Subject to any disclaimer, the term of this patent is extended or adjusted under 35 U.S.C. 154(b) by 0 days.

(21) Appl. No.: 14/270,725

(22) Filed: May 6, 2014

(65) Prior Publication Data
US 2014/0237827 A1    Aug. 28, 2014

Related U.S. Application Data

(62) Division of application No. 12/879,115, filed on Sep. 10, 2010, now Pat. No. 8,769,833.

(51) Int. Cl.
| B26B 21/58 | (2006.01) |
|---|---|
| B62B 9/00 | (2006.01) |
| B23P 15/40 | (2006.01) |
| B26B 9/02 | (2006.01) |
| C23C 24/10 | (2006.01) |
| C23C 28/02 | (2006.01) |
| C23C 30/00 | (2006.01) |
| B26D 1/00 | (2006.01) |

(52) U.S. Cl.
CPC . *B62B 9/00* (2013.01); *B23P 15/40* (2013.01); *B26B 9/02* (2013.01); *C23C 24/10* (2013.01); *C23C 28/021* (2013.01); *C23C 28/027* (2013.01); *C23C 30/005* (2013.01); *B26B 21/58* (2013.01); *B26D 2001/002* (2013.01); *B26D 2001/0053* (2013.01)

(58) Field of Classification Search
CPC .... B26B 9/00; B26B 21/58; B26D 2001/002; B26D 2001/0053
See application file for complete search history.

(56) References Cited

U.S. PATENT DOCUMENTS

| 1,639,335 A | 8/1927 | Gaisman |
|---|---|---|
| 1,821,578 A | 9/1931 | Povalski |
| 1,823,976 A | 9/1931 | Gaisman |
| 1,849,919 A | 3/1932 | Gaisman |

(Continued)

FOREIGN PATENT DOCUMENTS

| AU | 2009202494 | 1/2010 |
|---|---|---|
| CA | 2161031 | 4/1996 |
| DE | 1553843 | 1/1971 |
| DE | 1553701.6 | 4/1971 |
| DE | 1553699.9 | 6/1971 |
| DE | 4012279.4 | 10/1991 |
| DE | 19829496.4 | 1/2000 |
| DE | 102004059260.8 | 3/2006 |
| EP | 0 580 349 | 1/1994 |
| EP | 0758026 | 2/1997 |
| EP | 1 287 953 | 3/2003 |
| EP | 1 454 705 | 9/2004 |
| EP | 1 761 369 | 3/2007 |

(Continued)

OTHER PUBLICATIONS

Partial European Search Report as issued for EP Patent Application No. 09163418.8, dated Nov. 5, 2009.

(Continued)

*Primary Examiner* — Hwei C Payer
(74) *Attorney, Agent, or Firm* — Pillsbury Winthrop Shaw Pittman LLP

(57) ABSTRACT

A utility knife blade includes a portion made of a first material; and an elongated portion made of a second material, the second material being harder than the first material and coated on the first material by melting a powder of the second material on the first material, the elongated portion forming the tip of the blade, wherein the second material includes tungsten carbide particles embedded in a soft binder, and wherein the size of at least 90% of the tungsten carbide particles is lower than about 5 micrometers.

25 Claims, 15 Drawing Sheets

(56) References Cited

U.S. PATENT DOCUMENTS

| | | |
|---|---|---|
| 1,855,478 A | 4/1932 | Gaisman |
| 2,032,963 A | 3/1936 | Voltmann |
| 2,073,501 A | 3/1937 | Stargardter |
| 2,073,502 A | 3/1937 | Stargardter |
| 2,131,505 A | 9/1938 | Garsson |
| 2,137,817 A | 11/1938 | Tuerff |
| 2,244,053 A | 6/1941 | Comstock |
| 2,326,774 A | 8/1943 | Freedman |
| 2,964,420 A | 12/1960 | Poorman et al. |
| 3,283,117 A | 11/1966 | Holmes et al. |
| 3,471,385 A | 10/1969 | Farrell |
| 3,480,483 A | 11/1969 | Wilkinson |
| 3,490,314 A | 1/1970 | Calnan |
| 3,496,973 A | 2/1970 | Ballard |
| 3,652,342 A | 3/1972 | Fischbein et al. |
| 3,664,884 A | 5/1972 | Underwood |
| 3,743,551 A | 7/1973 | Sanderson |
| 3,751,283 A | 8/1973 | Dawson |
| 3,754,329 A | 8/1973 | Lane |
| 3,916,523 A | 11/1975 | Lane et al. |
| 4,004,042 A | 1/1977 | Fairbairn |
| 4,015,100 A | 3/1977 | Gnanamuthu et al. |
| RE29,815 E | 10/1978 | Gnanamuthu |
| 4,269,868 A | 5/1981 | Livsey |
| 4,299,860 A | 11/1981 | Schaefer et al. |
| 4,300,474 A | 11/1981 | Livsey |
| 4,323,756 A | 4/1982 | Brown et al. |
| 4,488,882 A | 12/1984 | Dausinger et al. |
| 4,533,812 A | 8/1985 | Lorenz |
| 4,547,649 A | 10/1985 | Butt et al. |
| 4,600,599 A | 7/1986 | Wallsten |
| 4,644,127 A | 2/1987 | La Rocca |
| 4,653,373 A | 3/1987 | Gerber |
| 4,720,621 A | 1/1988 | Langen |
| 4,720,918 A * | 1/1988 | Curry et al. ................. 30/346.55 |
| 4,724,299 A | 2/1988 | Hammeke |
| 4,981,756 A | 1/1991 | Rhandhawa |
| 5,066,553 A | 11/1991 | Yoshimura et al. |
| 5,204,167 A | 4/1993 | Saijo et al. |
| 5,295,305 A | 3/1994 | Hahn et al. |
| 5,304,771 A | 4/1994 | Griffin et al. |
| 5,368,947 A | 11/1994 | Denney |
| 5,418,350 A | 5/1995 | Freneaux et al. |
| 5,449,536 A | 9/1995 | Funkhouser et al. |
| 5,453,329 A | 9/1995 | Everett et al. |
| 5,476,531 A | 12/1995 | Timm et al. |
| 5,477,026 A | 12/1995 | Buongiorno |
| 5,477,616 A | 12/1995 | Williams et al. |
| 5,486,676 A | 1/1996 | Aleshin |
| 5,543,183 A | 8/1996 | Streckert et al. |
| 5,620,754 A | 4/1997 | Turchan et al. |
| 5,709,907 A | 1/1998 | Battaglia et al. |
| 5,724,868 A | 3/1998 | Knudsen et al. |
| 5,731,046 A | 3/1998 | Mistry et al. |
| 5,736,709 A | 4/1998 | Neiheisel |
| 5,837,960 A | 11/1998 | Lewis et al. |
| 5,906,053 A | 5/1999 | Turner et al. |
| 5,953,969 A | 9/1999 | Rosenhan |
| 6,083,570 A | 7/2000 | Lemelson et al. |
| 6,109,138 A | 8/2000 | Upton |
| 6,146,476 A | 11/2000 | Boyer |
| 6,293,020 B1 | 9/2001 | Julien |
| 6,316,065 B1 | 11/2001 | Wallmann |
| 6,396,025 B1 | 5/2002 | Pyritz et al. |
| 6,497,772 B1 | 12/2002 | Meckel et al. |
| 6,534,745 B1 | 3/2003 | Lowney |
| 6,612,204 B1 | 9/2003 | Droese et al. |
| 6,617,271 B1 | 9/2003 | Kodash et al. |
| 6,623,876 B1 | 9/2003 | Caron |
| 6,701,627 B2 | 3/2004 | Korb et al. |
| 6,756,561 B2 | 6/2004 | McGregor et al. |
| 6,857,255 B1 | 2/2005 | Wilkey et al. |
| 6,881,919 B2 | 4/2005 | Pyritz et al. |
| 6,883,405 B2 | 4/2005 | Strauch |
| 6,995,334 B1 | 2/2006 | Kovacevic et al. |
| 6,995,335 B2 | 2/2006 | Wessner |
| 7,060,367 B2 | 6/2006 | Yamada et al. |
| 7,111,376 B2 | 9/2006 | Lombardi et al. |
| 7,139,633 B2 | 11/2006 | Mazumder et al. |
| 7,140,113 B2 | 11/2006 | King et al. |
| 7,259,353 B2 | 8/2007 | Guo |
| 7,284,461 B2 | 10/2007 | Skrobis et al. |
| 7,658,129 B2 | 2/2010 | Korb et al. |
| 7,673,541 B2 | 3/2010 | Skrobis et al. |
| 8,316,550 B2 * | 11/2012 | Howells .......................... 30/350 |
| 8,769,833 B2 * | 7/2014 | Culf .......................... 30/346.54 |
| 2003/0019332 A1 | 1/2003 | Korb et al. |
| 2003/0070305 A1 | 4/2003 | Oshika et al. |
| 2004/0244539 A1 * | 12/2004 | Korb et al. .................... 76/104.1 |
| 2005/0040147 A1 | 2/2005 | Hoebel et al. |
| 2005/0056628 A1 | 3/2005 | Hu |
| 2006/0032840 A1 | 2/2006 | Bagavath-Singh |
| 2006/0049153 A1 | 3/2006 | Cahoon et al. |
| 2006/0081571 A1 | 4/2006 | Hoebel et al. |
| 2006/0242844 A1 | 11/2006 | Skrobis et al. |
| 2006/0257689 A1 | 11/2006 | Sottke et al. |
| 2006/0266740 A1 | 11/2006 | Sato et al. |
| 2007/0006683 A1 | 1/2007 | Howells |
| 2007/0042205 A1 | 2/2007 | Hultinstigenberg et al. |
| 2007/0131060 A1 | 6/2007 | Kelsey et al. |
| 2007/0163128 A1 | 7/2007 | Tarrerias |
| 2007/0261867 A1 | 11/2007 | Techel et al. |
| 2008/0178476 A1 | 7/2008 | Luttgens |
| 2008/0189957 A1 | 8/2008 | Kasper |
| 2008/0189959 A1 | 8/2008 | Howells |
| 2009/0250144 A1 * | 10/2009 | Kumagai et al. .............. 148/535 |
| 2009/0314136 A1 | 12/2009 | Culf |
| 2009/0322143 A1 * | 12/2009 | Krauter .......................... 299/105 |
| 2010/0043232 A1 | 2/2010 | Skrobis et al. |
| 2010/0263491 A1 | 10/2010 | Korb et al. |
| 2011/0078909 A1 | 4/2011 | Lambert |
| 2012/0031249 A1 | 2/2012 | Morisada et al. |
| 2014/0237827 A1 * | 8/2014 | Culf ................................ 30/350 |

FOREIGN PATENT DOCUMENTS

| | | |
|---|---|---|
| EP | 1 838 504 | 10/2007 |
| EP | 1 953 004 | 8/2008 |
| EP | 1 965 957 | 9/2008 |
| EP | 2 138 263 | 12/2009 |
| FR | 2534494 | 4/1984 |
| GB | 1149781 | 4/1969 |
| GB | 1165980 | 10/1969 |
| JP | 58-177238 | 10/1983 |
| JP | 63-220988 | 9/1988 |
| JP | 2001-322022 | 11/2001 |
| JP | 2003-266370 | 9/2003 |
| JP | 2004-082493 | 3/2004 |
| JP | 4204293 | 1/2009 |
| JP | 2010-000596 | 1/2010 |
| WO | WO 92/19424 | 11/1992 |
| WO | WO 01/02118 | 1/2001 |
| WO | WO 02/079540 | 10/2002 |
| WO | WO 03/000457 | 1/2003 |
| WO | WO 2006/065624 | 6/2006 |
| WO | WO 2007/049064 | 5/2007 |
| WO | WO 2010/034891 | 4/2010 |

OTHER PUBLICATIONS

Extended European Search Report as issued for EP Patent Application No. 09163418.8, dated Jan. 14, 2010.

Extended Search Report, including the European Search Opinion, as issued for European Patent Application No. 11180705.3, dated Jan. 23, 2012.

Extended European Search Report, including the Search Opinion, as issued for European Patent Application No. 11192478.3, dated Mar. 16, 2012.

* cited by examiner

UTILITY KNIFE BLADE

CROSS-REFERENCE TO RELATED APPLICATIONS

This application is a divisional application of U.S. patent application Ser. No. 12/879,115 filed on Sep. 10, 2010, now U.S. Pat. No. 8,769,833, which is incorporated herein by reference in its entirety.

BACKGROUND

Cutting devices, such as utility knives, have been developed for use in various applications, such as, for example, construction, packaging and shipping, carpet installation, as well as other purposes.

The use of tungsten carbide as cutting material in cutting devices is well known in the art. Tungsten carbide is used extensively in various cutting, drilling, milling and other abrasive operations due to its high abrasion resistant properties. Conventional cutting tools like power saw blades have tungsten carbide inserts brazed onto the blade teeth. This makes the actual cutting surface extremely hard and durable. However, brazing is not a suitable process for mounting tungsten carbide inserts on many cutting tools, such as utility blades.

SUMMARY

One aspect of the invention involves a utility knife blade including a coating of tungsten carbide. Another aspect of the invention involves a method of manufacturing a blade having a hard coating deposited on its edge. The method includes depositing a hard material, e.g. tungsten carbide, onto the edge of a cutting tool and then sharpening the edge such that the surface is entirely made of the hard material, e.g. tungsten carbide, after sharpening.

In an aspect of the invention, there is provided a utility knife blade including a portion made of a first material; and an elongated portion made of a second material, the second material being harder than the first material and coated on the first material by melting a powder of the second material on the first material, the elongated portion forming the tip of the blade, wherein the second material includes tungsten carbide particles embedded in a soft binder, and wherein the size of at least 90% of the tungsten carbide particles is lower than about 5 micrometers.

In an aspect of the invention, there is provided a manufactured blade for a cutting tool comprising: a first elongated portion made of a first material; and a second elongated portion made of the first material and a second material, the second material being harder than the first material and deposited on the first material, the second elongated portion forming the tip of the blade, wherein the first elongated portion defines a first cutting edge having a first angle and the second elongated portion defines a second cutting edge having a second angle, the first angle being smaller than the second angle, and wherein a transition from the first angle to the second angle occurs in a region of the blade made of the first material that has been re-hardened during deposition of the second material on the first material.

In another aspect of the invention, there is provided a manufactured blade for a cutting tool comprising: a portion made of a first material; and an elongated portion made of the first material and a second material, the second material being harder than the first material and deposited on the first material, the elongated portion forming the tip of the blade, wherein the elongated portion forms a facet of the blade that is oriented at a non-zero angle relative to a surface of the portion of the blade, and wherein a transition from the surface of the portion to the facet of the elongated portion occurs in a region of the blade made of the first material that has been re-hardened during deposition of the second material on the first material.

In yet another aspect of the invention, there is provided a manufactured blade for a cutting tool comprising: a portion made of a first material and having a hardness in a range from about 500 Hv to about 700 Hv; and an elongated portion made of the first material and a second material, the second material being harder than the first material and deposited on the first material and having a hardness greater than about 1,100 Hv, the elongated portion forming the tip of the blade, wherein the elongated portion forms a facet of the blade that is oriented at a non-zero angle relative to a surface of the portion of the blade, and wherein the second material includes tungsten carbide particles that have a size less than about 5 micrometers.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It should be appreciated that the microphotographs herein are to scale (relative proportions are depicted). It is to be expressly understood, however, that the drawings and microphotographs are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
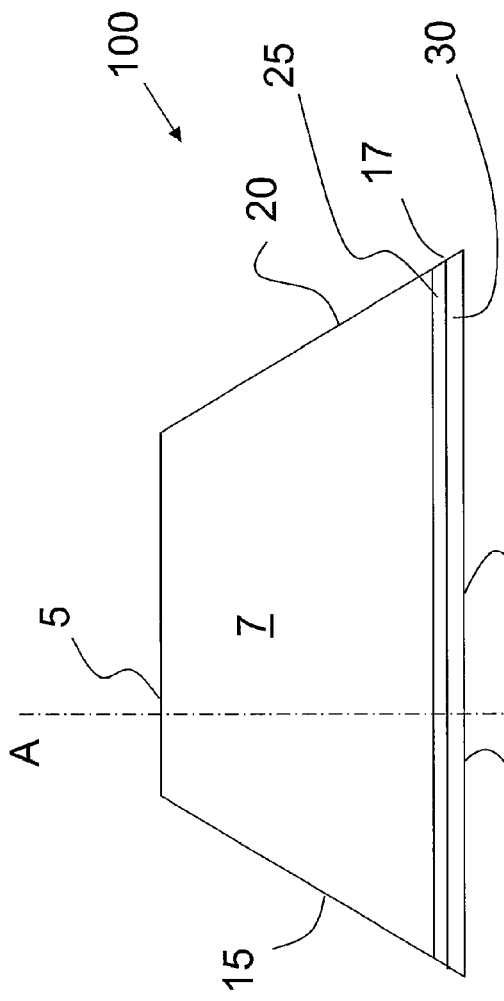
FIG. 1 shows a utility blade in accordance with an embodiment of the invention.

FIG. 1 shows a utility knife blade 100 in accordance with an embodiment of the invention. Utility knife blade 100 defines a back edge 5, a cutting edge 10 and two side edges 15 and 20 located on opposite sides of the blade relative to each other. As shown in FIG. 1, the back edge 5, the cutting edge 10 and the two side edges 15 and 20 define an approximately trapezoidal configuration, although this invention is not limited to blades on any particular shape. For example, other shapes (e.g. rectangular) are contemplated. The utility knife blade 100 also generally has a main portion 7 and cutting edge portion 17. As will be described in more detail hereinafter, the cutting edge portion 17 is formed by two elongated portions that are oriented at different angles relative to the main portion 7 and that extend lengthwise, generally parallel to the tip 18. Specifically, the cutting edge portion 17 includes a first elongated portion 25 and a second elongated portion 30 formed at the tip 18 of the blade 100. It will be appreciated that embodiments of the invention are not limited to the configuration of FIG. 1. Just for example, it is envisioned that in another embodiment, the cutting edge portion 17 includes a single elongated portion, which corresponds to the second elongated portion 30. In yet another embodiment, the cutting edge portion 17 includes more than two elongated portions.

Figure 2A:
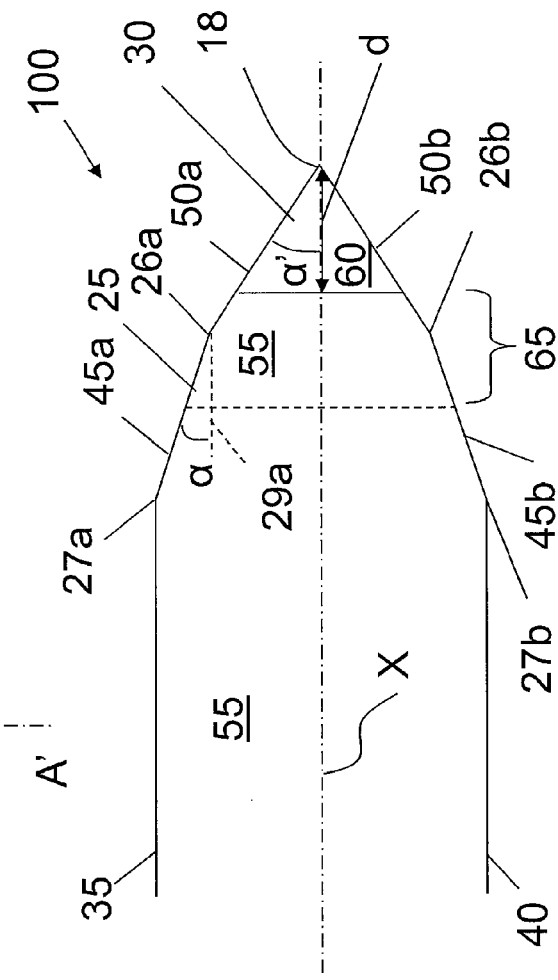
FIG. 2a shows a cross section of a utility blade in accordance with an embodiment of the invention.

Referring now to FIG. 2a, this figure shows a cross section of the blade 100 taken along the line AA' of FIG. 1. As shown in FIG. 2a, the blade 100 further defines substantially planar top and bottom portions 35 and 40 that are located on opposite sides of the blade 100 relative to each other. The first elongated portion 25 includes first facets 45a and 45b that are contiguous with, respectively, planar top and bottom portions 35 and 40. Facet 45a lies between first exterior point 27a and second exterior point 26a. Similarly, facet 45b lies between first exterior point 27b and 26b. The second elongated portion 30 includes second facets 50a,b that are contiguous with, respectively, first facets 45a,b. The first facets 45a,b define a first angle α in the manner illustrated (where line 29a is parallel to the central axis X) and the second facets 50a,b define a second angle α' in the manner illustrated (angle between facet 50a and central axis X). The first angle α is smaller than the second angle α'. In an embodiment of the invention, the first angle α is between 6° and 10° (such as about 8°) and the second angle α' is between 12° and 16° (such as about) 14°.

In an embodiment of the invention, the first elongated portion 25 (which may be considered to generally reside in the region defined by blunt points 26a, 26b, 27a, 27b) and the main portion 7 of the blade 100 are made of a same first material 55, while the second elongated portion 30 (which may be considered to reside in the regions defined by points 26a, 26b and tip 18) is made of the first material 55 and of a second material 60 that has a hardness greater than the first material 55. In an embodiment, the first material 55 is steel and the second material 60 is tungsten carbide. In addition, the blade 100 defines an intermediate or overlapping portion 65 arranged across the junction between the first elongated portion 25 and the second elongated portion 30. In one embodiment, the intermediate portion 65 may be formed of the first material 55. The first material 55 in the intermediate portion 65 has a hardness greater than the hardness of the first material 55 outside the intermediate portion 65 but lower than the hardness of the second material 60. In an embodiment of the invention, the intermediate portion 65 corresponds to a region of the first material 55 that has been re-hardened during formation of the second material 60. It should be appreciated that while the figures illustrate the boundaries between regions and/or materials as distinct lines, in actual practice such boundaries may be irregular and may also be broader transitional regions as will be appreciated by those skilled in the art.

In FIG. 2a, the deposition of the second material 60 (e.g. tungsten carbide) in accordance with an embodiment of the invention provides a blade 100 that has a surface of second material 60 (e.g. tungsten carbide) that is flush with the remaining surface of the blade. The second material 60 (e.g. tungsten carbide) may be welded to the first material 55 so as to form a seamless transition between the second material 60 (e.g. tungsten carbide) and the core first material 55 of the blade 100.

In FIGS. 1 and 2a, the transition (e.g., at points 26a and/or 26b) from the first angle α to the second angle α' or from the first facets 45a,b to the second facets 50a,b occurs in the intermediate region 65 of the blade 100 made of the first material 55 that has been re-hardened during deposition of the second material 60 on the first material 55. Changing the cutting edge angle in the re-hardened area of the first material 55 rather than in the second material 60 facilitates the grinding operations and limits the amount of the second material 60 in the second elongated portion 30. In an embodiment, the second material 60 occupies a volume greater than 50% of a total volume of the second elongated portion 30. In another embodiment of the invention, the second material 60 occupies a volume greater than 70% of a total volume of the second elongated portion 30.

In one embodiment of the invention, the thickness of the second material 60 in the second elongated portion 30 as defined by the distance d between the tip 18 of the blade 100 and the intermediate portion 65 after grinding is in a range of from about 0.1 to 0.3 mm. In an embodiment, it will be appreciated that the distance d can extend to the blunt points 26a, 26b (as seen along the central axis X) so that the entire second elongated portion 30 is made of the second material 60. The thickness of the intermediate portion 65, which corresponds to the re-hardened portion of the first material 55, is in a range of from about 0.3 and 0.4 mm. Further, the thickness of the main portion 7 of the blade 100 is between 0.4 mm and 0.8 mm (such as about 0.6 mm). It will be appreciated that these thicknesses may vary in other embodiments of the invention depending on the type of materials used to manufacture the blade and the geometry of the blades.

Figure 2B:
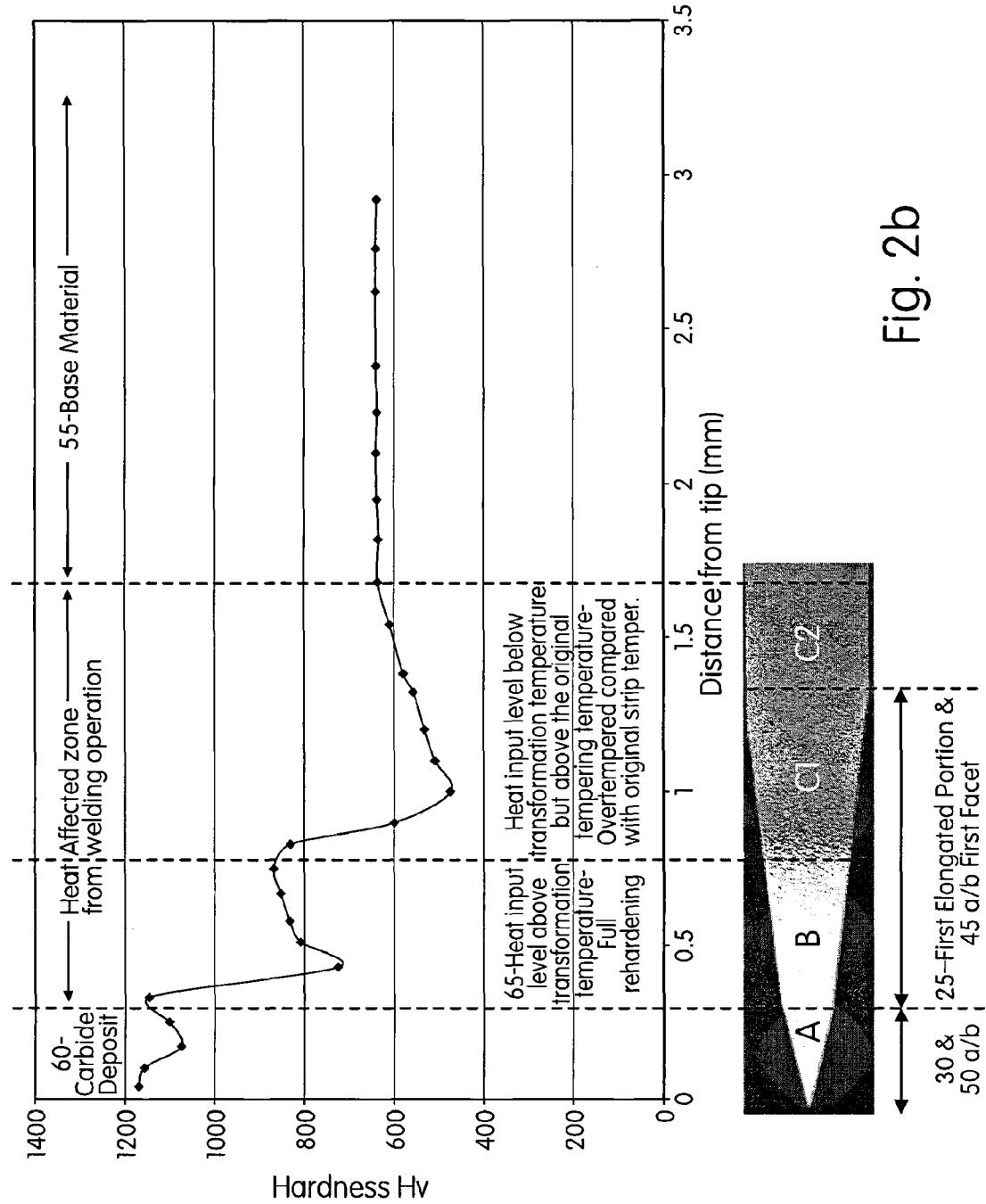
FIG. 2b shows a hardness profile of the utility blade and a microphotograph image of the blade in accordance with an embodiment of the invention.

In an embodiment of the invention, the hardness of the second material 60 is greater than 1,100 Hv and the hardness of the first material 55 is in a range of from about 500 Hv to about 700 Hv. In another embodiment, the hardness of the first material is in a range of from about 630 Hv to about 650 Hv. For example, referring to FIG. 2b, this figure shows a hardness profile of the blade 100 in accordance with an example embodiment. The profile was determined for a blade including tungsten carbide as second material 60. The hardness profile comprises 4 hardness regions. The first hardness region A is defined by the second material 60 and extends, in this embodiment, axially (e.g., along axis X in FIG. 2a) to a depth at which the blunt points 26a, 26b so that the entire second elongated portion 30 is made of the second material 60. This embodiment is different from that in FIG. 2a, wherein the first hardness region (defined by the second material 60) does not extend all the way to the blunt portions 26a, 26b. The second and third hardness regions B and (C1 and C2) are the heat affected zones from the welding operation. The hardness profile in these regions is determined by the gradient of temperatures that is generated by the welding operation. The second hardness region B corresponds to an untempered martensite region in which the first base material 55 has been fully rehardened. As a result, the first material has become austenitic during the welding process and has a hardness that is greater than the first material 55 in region C1. Immediately below region B lies regions C1 and C2. Regions C1 and C2 have not attained a sufficiently high temperature to become austenitic during the welding process, but have reached a temperature higher than the tempering temperature used in the original strip heat treatment process. As a result, regions C1 and C2 have been overtempered compared with the non heat affected region of the base material 55. This produces a lower hardness zone compared with the regions B and the non heat affected region of the base material 55. It is noted that the overtempering is greater in the region C1 than in the region C2 as a result of a gradient of temperatures affecting the blade. In FIG. 2b, the area of retempering exists within the first facet 45a and 45b (area C1) and beyond into the body of the blade 55 (area C2).

The laser deposition welding process in one embodiment provides a shallow level of heat penetration to reduce or eliminate distortion of the substrate. With the laser welding process, the heat produced at the surface of the strip is sufficient to melt both the powder binder and the strip surface. The region immediately behind the weld pool attains a temperature sufficiently high to transform to austenite while in the area of influence of the laser. But the body strip below the surface remains relatively cool, so that when the strip exits the influence of the laser beam, heat is drawn back into the cold strip at a rate which exceeds the critical cooling rate for hardening. This results in an area of untempered martensite (area B), with a typical hardness in the range of HV 750-900.

In one embodiment, only one side of the blade may be ground. In addition, for example, only point 26a may be formed, while point 26a may be omitted (e.g. a straight line formed on the opposite side of the blade between tip 18 and point 45b).

Figure 3:
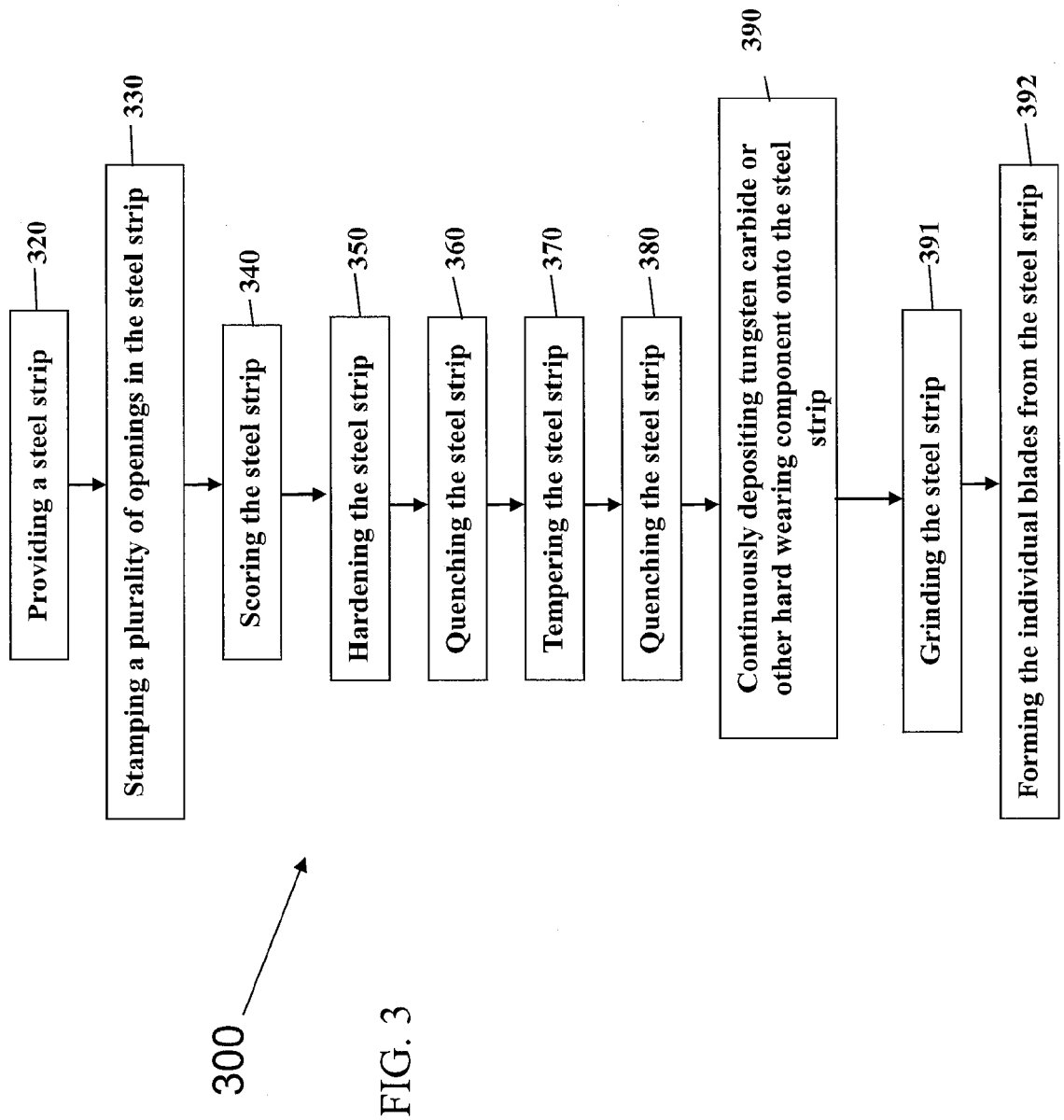
FIG. 3 shows a flowchart for manufacturing a blade of a cutting tool in accordance with an embodiment of the invention.

Referring now to FIG. 3, this figure shows a flow chart of a process 300 of manufacturing the blade 100 according to an embodiment of the present invention. In the process 300 of manufacturing a blade, a strip of steel blade stock material (i.e. the first material 55), from which a plurality of blades are produced, is provided at step 320. In one embodiment, the steel is provided in a coil form, for example, to render the strip more compact to facilitate handling. In an embodiment of the invention, the first material is made of steel and may include a high carbon steel such as, for example, steel grade ANSI 1095 or a low alloy steel (e.g. AISI 4147), although it is contemplated that other types of materials could be used in other embodiments of the invention. The length of the strip in the coil can be as long as 1 km or more. The strip may also be provided in a multiple coils configuration, the multiple coils being welded end to end. The dimension of the strip can be selected according to desired dimensions of the blade 100. For example, the strip can have a width of 19 mm and a thickness of 0.6 mm. However, the strip can have other dimensions depending on the intended use of the blade that would be formed from the steel strip. In an embodiment of the invention, the steel strip is provided with a maximum hardness of about 300 Hv.

Figure 4:
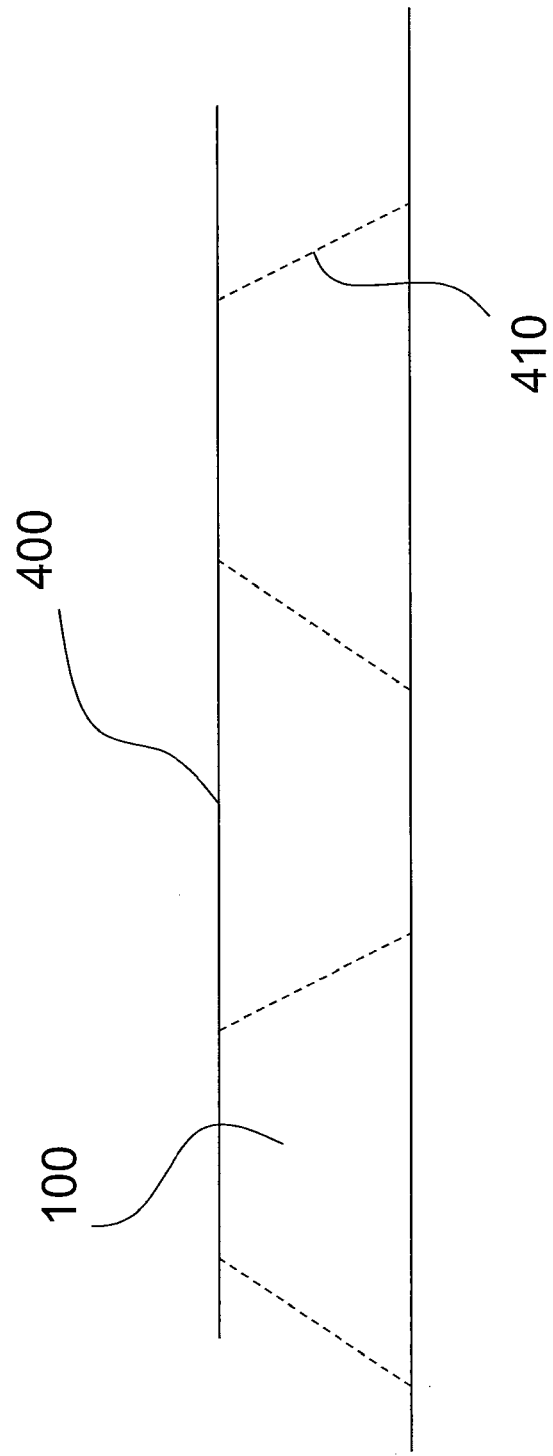
FIG. 4 shows a steel strip in accordance with an embodiment of the invention.

At step 330, the steel strip material is delivered to a punch press where a plurality of openings are stamped into the strip to define attachment points employed to retain the blade in a cartridge or onto a blade carrier for utility knife. In addition, a brand name, logo or other indicia may also be stamped thereon. The steel strip is then scored at step 340 to form a plurality of axially spaced score lines, wherein each score line corresponds to a side edge of a respective blade and defines a breaking line for later snapping or cutting the scored strip into a plurality of blades. FIG. 4 is a schematic representation of a portion of the strip made of the first material (or steel strip) 400 that shows the score lines 410. The score lines define individual blades 100 that have a trapezoid shape. Other forms and shapes such as parallelogram blades, hook blades, etc. may also be obtained with a selection of an appropriate scoring configuration.

In one embodiment, the scoring and piercing procedures of steps 330 and 340 can be combined into a single stamping operation.

After scoring and piercing the steel strip, the process proceeds to step 350, where the steel strip 400 is hardened prior to depositing the second material. The heat treatment prior to deposition of the second material 60 is represented by steps 350-390 in FIG. 3 and is designed so that the blade 100 can absorb the stress experienced by the blade during deposition of the second material 60.

As shown in FIG. 3, the coil of pressed steel strip of blade stock is then fed at step 350 through a heat treatment line to harden the steel strip material. In this process, the steel is run off of the coil and passed through a hardening furnace which heats the steel to a temperature above a transition temperature. The transition temperature is the temperature at which the structure of the steel changes from a body centred cubic structure, which is stable at room temperature, to a face centred cubic structure known as austenite (austenitic structure), which is stable at elevated temperatures, i.e. above the transition temperature. The transition temperature varies depending on the steel material used. In an embodiment of the invention, the heating to harden the steel strip is performed at a temperature between about 800° C. and 900° C. For example, for a grade 1095 steel, the transition temperature is approximately 890° C.

In an embodiment of the invention, the length of the hardening/heating furnace is approximately 26 feet (approximately 8 meters). The steel strip travels at a speed approximately between 16 and 22 feet per minute (approximately between 5 and 7 meters per minute). A controlled atmosphere of, for example, "cracked ammonia," which contains essentially nitrogen and hydrogen, is provided in the furnace to prevent oxidation and discoloration of the steel strip. Although cracked ammonia may be used to prevent oxidation and discoloration other gases may be used, such as but not limited to, "a scrubbed endothermic gas" or "molecular sieved exothermic gas."

In an embodiment of the invention, the heating of the steel strip to harden the steel strip is performed for a time period between about 75 and 105 seconds.

After exiting the heating (hardening) furnace, at step 360, the heat hardened steel strip is quenched. In an embodiment of the invention, the hardened steel strip is passed between liquid cooled conductive blocks disposed above and below the steel strip to quench the steel strip. In an embodiment of the invention, the heat hardened steel strip is passed through water-cooled brass blocks with carbide wear strips in contact with the steel strip to quench the steel. The brass blocks cool the steel strip from the hardening temperature, for example (approximately 890° C.), to ambient temperature (approximately 25° C.) at a speed above a critical rate of cooling. The critical rate of cooling is a rate at which the steel is cooled in order to ensure that the austenitic structure is transformed to martensitic structure. A martensitic structure is a body centred tetragonal structure. In the martensitic structure, the steel is highly stressed internally. This internal stress is responsible for the phenomenon known as hardening of the steel. After hardening, the hardness of the steel which was originally less than approximately 300 Hv (before heat treatment) becomes approximately 850 Hv (approximately 63 HRC). In an embodiment of the invention, the quenching of the steel strip is performed for about 2 to 4 seconds. In another embodiment of the invention, a gas or a liquid is used to quench the steel strip.

At step 370, the hardened steel strip then passes through a tempering furnace which heats the steel to a temperature between 150° C. and 400° C., for example about 350° C. This process improves the toughness of the blade and reduces the blade hardness, depending on the tempering temperature selected.

In an embodiment of the invention, the length of the tempering furnace is approximately 26 feet (approximately 8 meters). The steel strip travels at a speed approximately between 16 and 22 feet per minute (approximately between 5 and 7 meters per minute). A controlled atmosphere of, for example, "cracked ammonia," which contains essentially nitrogen and hydrogen, is provided in the furnace to prevent oxidation and discoloration of the strip. Although cracked ammonia may be used to prevent oxidation and discoloration other gases may be used, such as but not limited to a "scrubbed endothermic gas" or "molecular sieved exothermic gas". In the embodiment of the invention, the heating of the strip to temper the strip is performed for a time period between about 75 and 105 seconds.

After exiting the heating (tempering) furnace, at step 380, the hardened and tempered steel strip is quenched. In an embodiment of the invention, the hardened and tempered steel strip is passed between liquid cooled conductive quench blocks disposed above and below the steel strip to quench the steel strip. In an embodiment of the invention, the heat hardened and tempered steel strip is passed through water-cooled brass blocks with carbide wear strips in contact with the steel strip to quench the steel. The brass blocks cool the steel strip from the tempering temperature, for example (approximately 150° C. to 400° C., for example 350° C.), to ambient temperature (approximately 25° C.) at a speed above a critical rate of cooling to prevent oxidation of the steel surface.

It will be appreciated that the temperature ranges of the hardening and tempering operations at steps 350 and 380 can be controlled to obtain the desired blade hardness for the main portion 17 of the blade 100 and to reduce or prevent blade distortion during deposition of the second material 60. For example, if the hardness of the blade 100 is too low, the blade may bend and it may be difficult to snap off the individual blades 100 from the steel strip. Conversely, if the hardness of the blade 100 is too high, blade distortion may occur during deposition of the second material 60 on the first material 55. In one embodiment of the invention, the temperature of the hardening and tempering operations at steps 350 and 380 are controlled such that the resulting strip of first material 55 has a hardness, before deposition of the second material 60, in a range of from about 500 to 700 Hv. In a further embodiment, the hardness of the resulting strip of first material 55 is in a range of from about 630 to 650 Hv.

The coil of quenched steel strip is then continuously fed at step 390 to a second material 60 deposition station that is configured to apply a coating of the second material 60 to an edge of the steel strip. The hard material 60 has a hardness that is significantly greater than the steel strip. In one embodiment of the invention, the hardness of the hard material is at least 1100 Hv.

In one embodiment, the strip of the first material 55 is heat treated prior to deposition to reduce the likelihood that heat treating a soft coated strip with a second material would introduce cracks in the blade 100 or cause the coating of second material 60 to possibly disintegrate.

Figure 5:
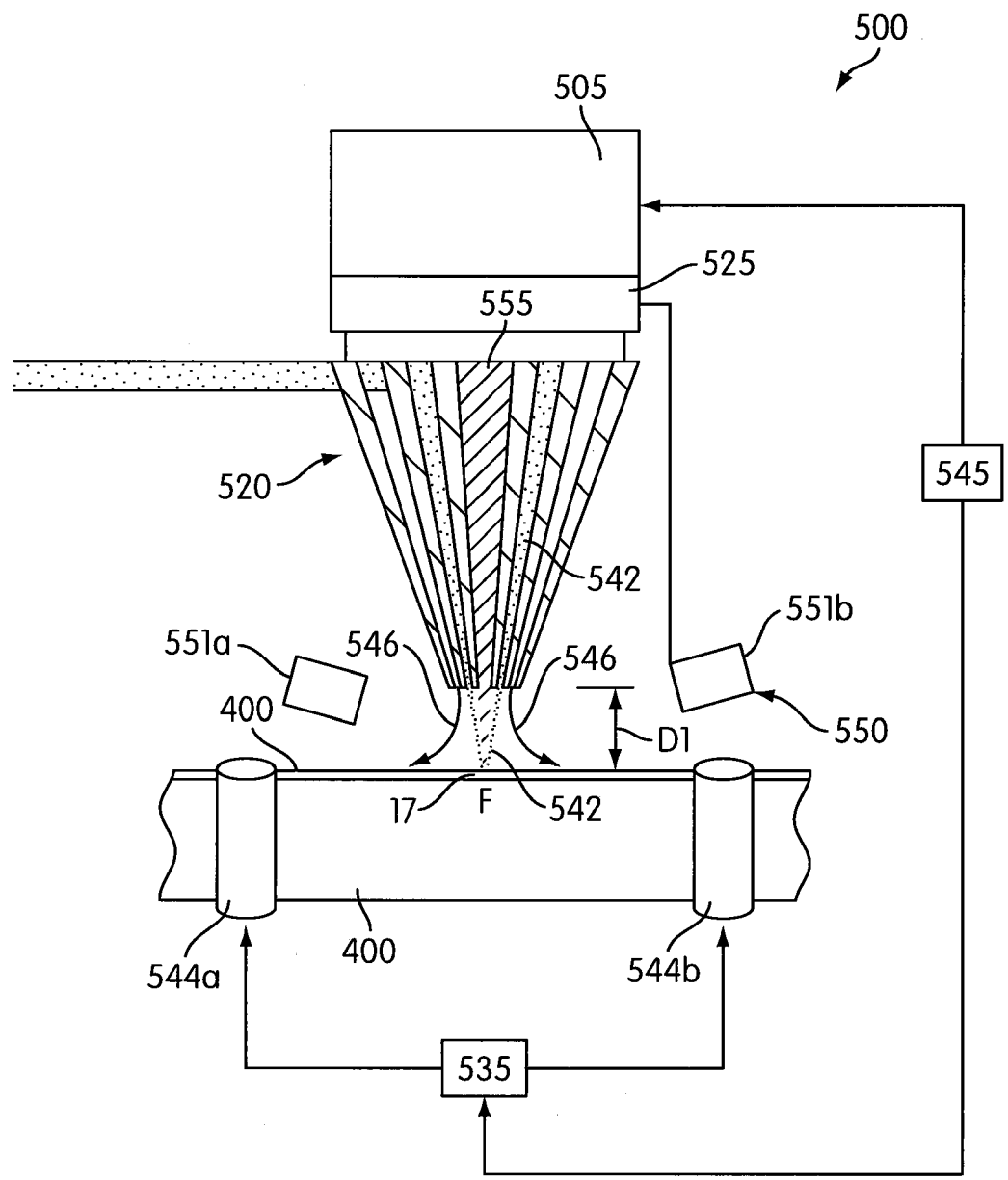
FIG. 5 shows a deposition station configured to deposit a hard metal (e.g. tungsten carbide) on an edge of a steel strip in accordance with an embodiment of the invention.

Referring now more particularly to FIG. 5, this figure is a schematic representation of a deposition station, generally indicated at 500, for depositing a coating of hard material, e.g. tungsten carbide, onto the edge portion 17 of the moving strip 400 made of the first material 55, in accordance with an embodiment of the invention. The deposition station 500 includes a radiation source 505 configured to provide a beam of radiation 555 onto the strip 400. The deposition station 500 further includes a projection system 525 configured to project and focus the beam of radiation 555 onto a target portion of the steel strip 400.

Referring back to FIG. 5, the radiation source 505 is configured to output a radiation beam with sufficient power and energy to melt the strip 400. In one embodiment, the radiation source is a solid state disk laser that outputs a beam of radiation in the infra-red (IR) range, with a wavelength of 1.03 micrometer. The laser is high pulse rate laser that outputs the beam continuously. In another embodiment of the invention, a fiber laser with a wavelength of 1.06 micrometer may be used. In yet another embodiment of the invention, a $CO_2$ laser with the principal wavelength bands centering around 9.4 and 10.6 micrometers may be used. The power of the $CO_2$ laser may be in the range of about a few kWatts, for example between 1 and 8 kWatts. In one embodiment, the power of the $CO_2$ laser is about 6 kWatts. Alternatively, a laser operating in the ultra-violet (UV) range could also be used in another embodiment of the invention such as, for example, a UV laser with a wavelength lower than 400 nm. Examples of UV lasers include excimer lasers.

It will be appreciated that the source of radiation 505 is not limited to a light source. For example, in an embodiment of the invention, an electron beam source or a plasma source may also be used in the deposition station 500. In this implementation, the electron beam source is configured to provide a beam of electrons with sufficient energy and power to melt the strip 400.

The beam of radiation 555 outputted by the radiation source 505 is directed to a projection system 525 that is configured to focus the beam onto the edge of the moving strip 400. The energy of the projected beam 555 that is concentrated on the edge 17 of the strip 400 is used to melt the target portion of the strip, and when used, the binder within the feed powder 542. In one embodiment of the invention, the spot of the radiation beam focused on the strip 400 has substantially the same thickness as the strip. For example, in one embodiment, the spot size is about 0.6 millimeter.

The projection system 525 may include various types of optical components, such as refractive, reflective, magnetic, electromagnetic, electrostatic or other types of optical components, or any combination thereof, to direct, shape, or control the radiation. In the event the radiation source is an electron beam source, electromagnetic lenses may be used to control and focus the beam 555.

It will be appreciated that the projection system 525 may be integral with the radiation source 505. The projection system 525 is preferably mounted to a frame that is stationary, although it is contemplated that one or more optical elements of the projection system 525 may be movable to control the shape of the projected radiation beam 555.

A dispenser or deposition head 520, arranged between the radiation source 505 and the strip 400, is configured to supply a mixture 542 of hard material and a binder element, collectively referred to as the second material 60, to the thin edge 17 of the strip 400. The dispenser 520 has a generally hollow shape to allow the beam of radiation 555 to pass therethrough.

Figure 9A:
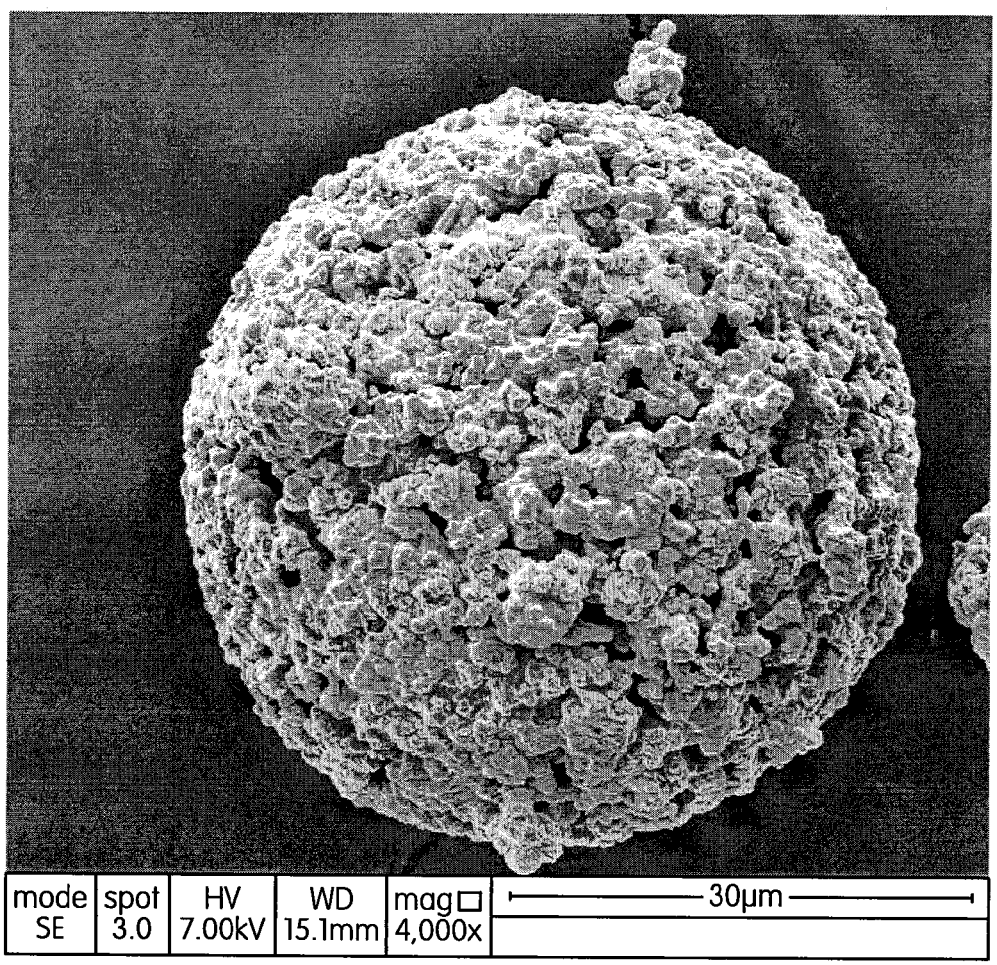
FIG. 9a is a perspective microphotograph of an individual powder particle before deposition having a nominal size of about 30 micrometers.

In an embodiment of the invention, the powder including the second material is a pre-blended mixture of the cobalt binder, chromium and the tungsten carbide. The source powder particle size should be high enough to reduce the likelihood of nozzle blockage. In an embodiment, the powder particle size (e.g. the diameter, equivalent diameter or largest distance between two extremities of a particle) is in a range between about 15 and 45 micrometers, for example nominally about 30 micrometers. FIG. 9a shows an individual powder particle before deposition having a nominal size of about 30 micrometers. The tungsten carbide particles, after deposition, remain largely unchanged. Only the binder is melted to produce the solid welded deposit. In an embodiment, the second material 60 has the following composition: cobalt in a range from about 8 and 12%, such as 9.5 to 10.5%, chromium in a range from about 2 to 5%, such as 3.5 to 4.5%, carbon in a range of from about 3 to 7%, such as 5 to 5.5% and tungsten (in an amount corresponding to the remaining balance). Other embodiments of the invention may use other percentage of tungsten carbide powder, or different materials.

Figure 9B:
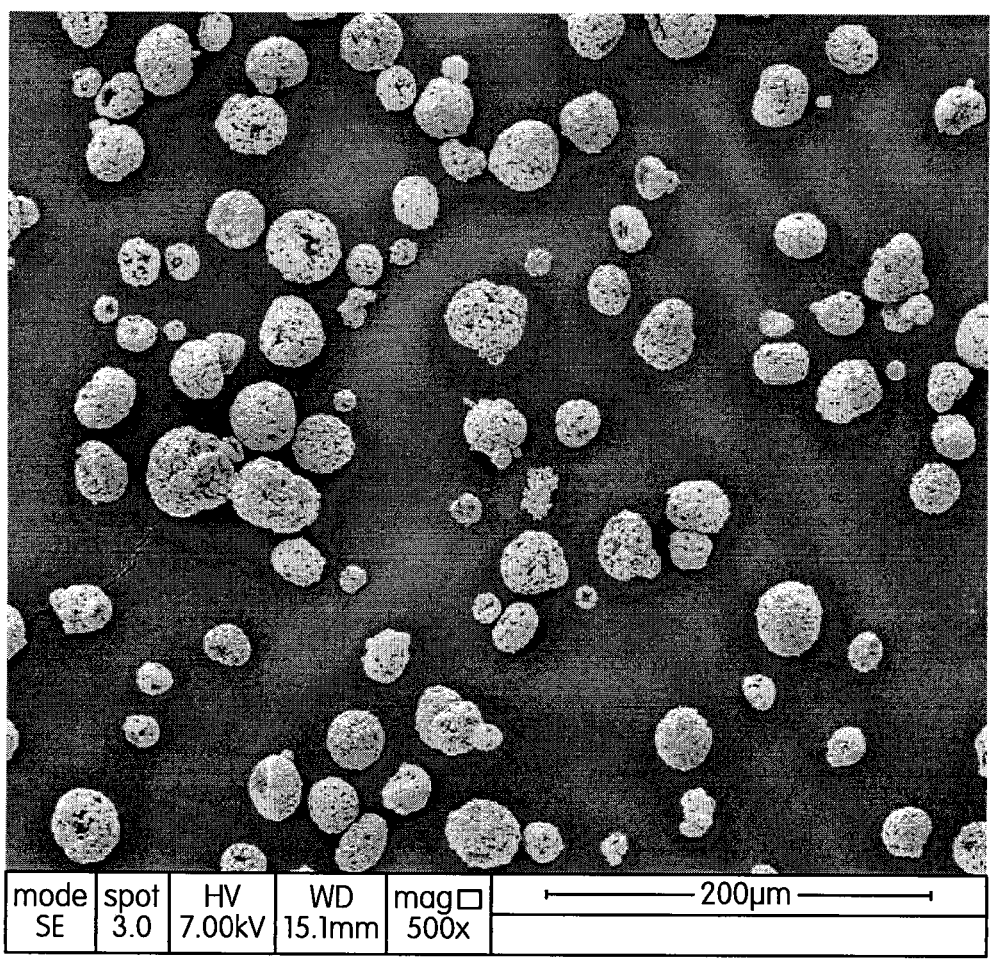
FIG. 9b is a perspective microphotograph of a plurality of powder particles.
Figure 9C:
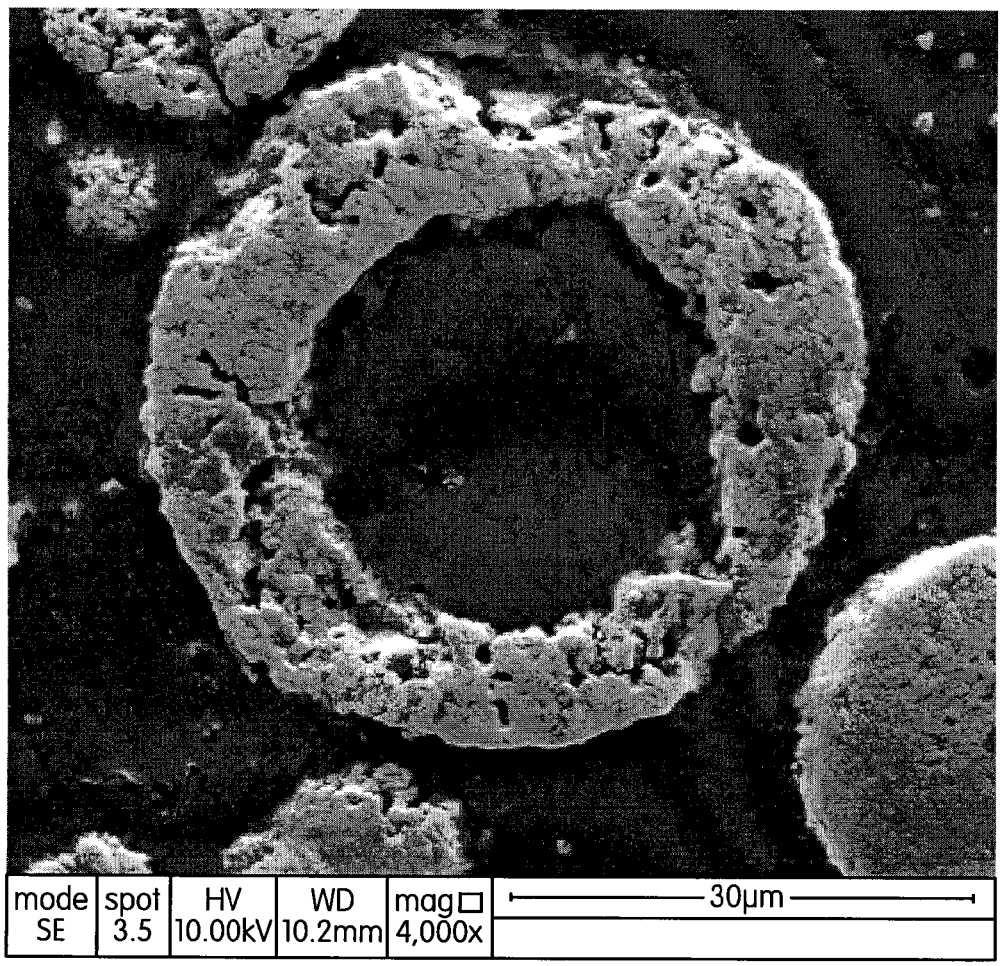
FIG. 9c shows a cross section microphotograph of a powder particle having a nominal size of about 30 micrometers.

In one embodiment, the powder particles have substantially the same morphology in terms of size (e.g. the diameter, equivalent diameter or largest distance between two extremities of a particle), shape and chemical composition to facilitate a uniform deposit of tungsten carbide on the blade. Referring to FIG. 9b, this figure shows powder particles having substantially the same morphology. In an embodiment, the powder particles are substantially spherical and have a density sufficiently low so that the powder is able to rapidly melt under the action of the laser beam. This favors the rapid formation of a uniform deposit of tungsten carbide on the blade. However, the powder density should also be high enough to facilitate the particles falling under the action of gravity and reach favorable flow rates. For example, in an embodiment, the powder density is high enough to obtain flow rates of powder particles on the blade greater than about 3 grams/second, in another embodiment greater than about 4 grams/second and in another embodiment greater than about 5 grams/second. In an embodiment, the powder has a density between about 2 and 6 grams per cubic centimeter. For example, in an embodiment, the powder density is between about 3 and 5 grams per cubic centimeter, for example, about 4 grams per cubic centimeter. In an embodiment, the substantially low density is obtained by using substantially porous powder particles. FIG. 9c shows a cross section of a powder particle according to an embodiment of the invention. As shown in FIG. 9c, the particle powder, which has a spherical shape, is substantially hollow.

Figure 9D:
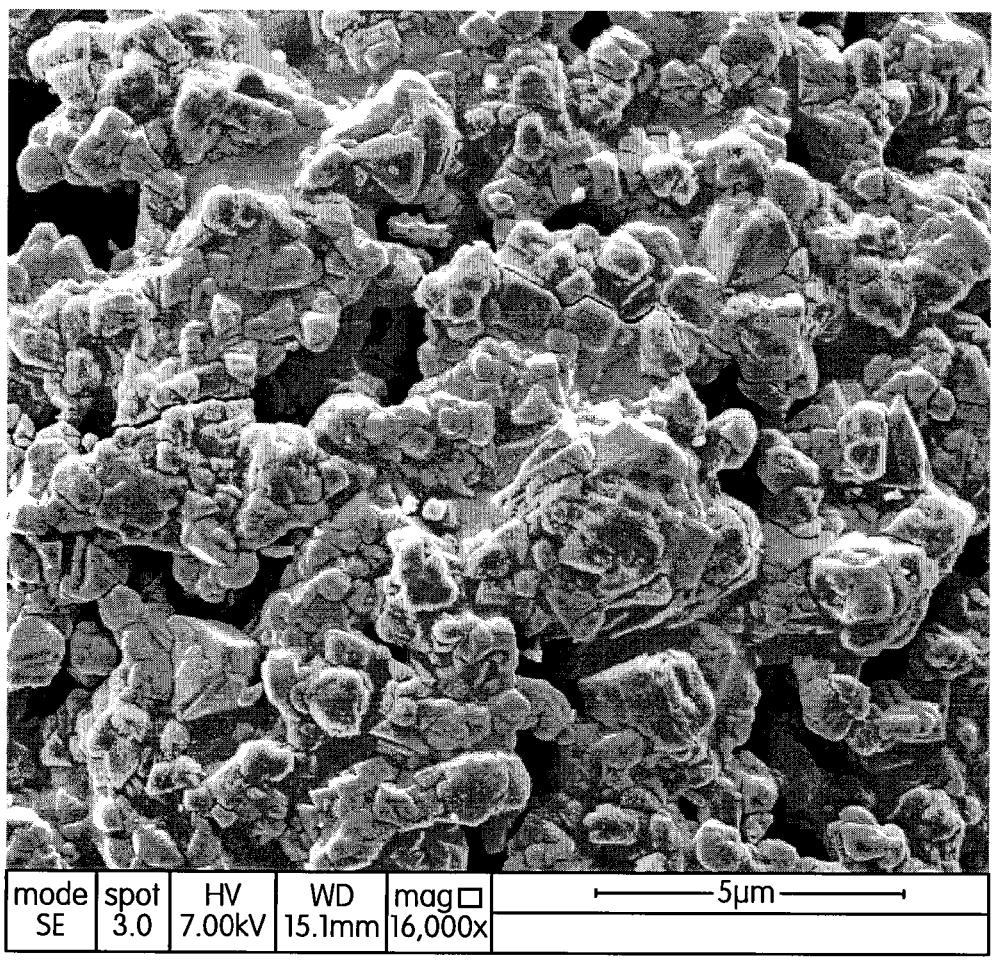
FIG. 9d is a microphotograph illustrating tungsten carbide particles embedded in the cobalt carrier and having a size less than about 1 micrometer.

In one embodiment it may be desirable that the particle size (e.g. the diameter, equivalent diameter or largest distance between two extremities of a particle) of the tungsten carbide particle or at least 90% of the tungsten carbide particles (and in another embodiment at least 99%) within the powder can be less than about 5 micrometers, and in another embodiment at least 90% (and in another embodiment at least 99%) equal to or less than about 2 micrometers to facilitate grinding to a sharp edge. In an embodiment, the powder is manufactured as agglomerated—sintered to form a powder that has individual tungsten carbide particles within a metal matrix or binder. In an embodiment, the size of these tungsten carbide is 95%, and in another embodiment 99% less than 2 micrometers, as measured by laser size diffraction. In particular, the size and distribution of the tungsten carbide particles within each powder particle can, in one embodiment, be substantially uniform in order to favor the formation of a uniform deposit of tungsten carbide on the blade. FIG. 9d shows tungsten carbide particles embedded in the cobalt binder and having a size less than about 1 micrometer. The performance of the cutting edge of the blade 100 is at least partially dependent on the size of the particles of the second material (e.g. tungsten carbide) embedded in the matrix of softer binder (e.g. cobalt, nickel, iron, . . . ). Powders containing large particles are generally less suitable because the carbide particles themselves may not be able to be ground to a sharp edge and the bonding matrix, being soft, may not be able to withstand the grinding forces.

Figure 9E:
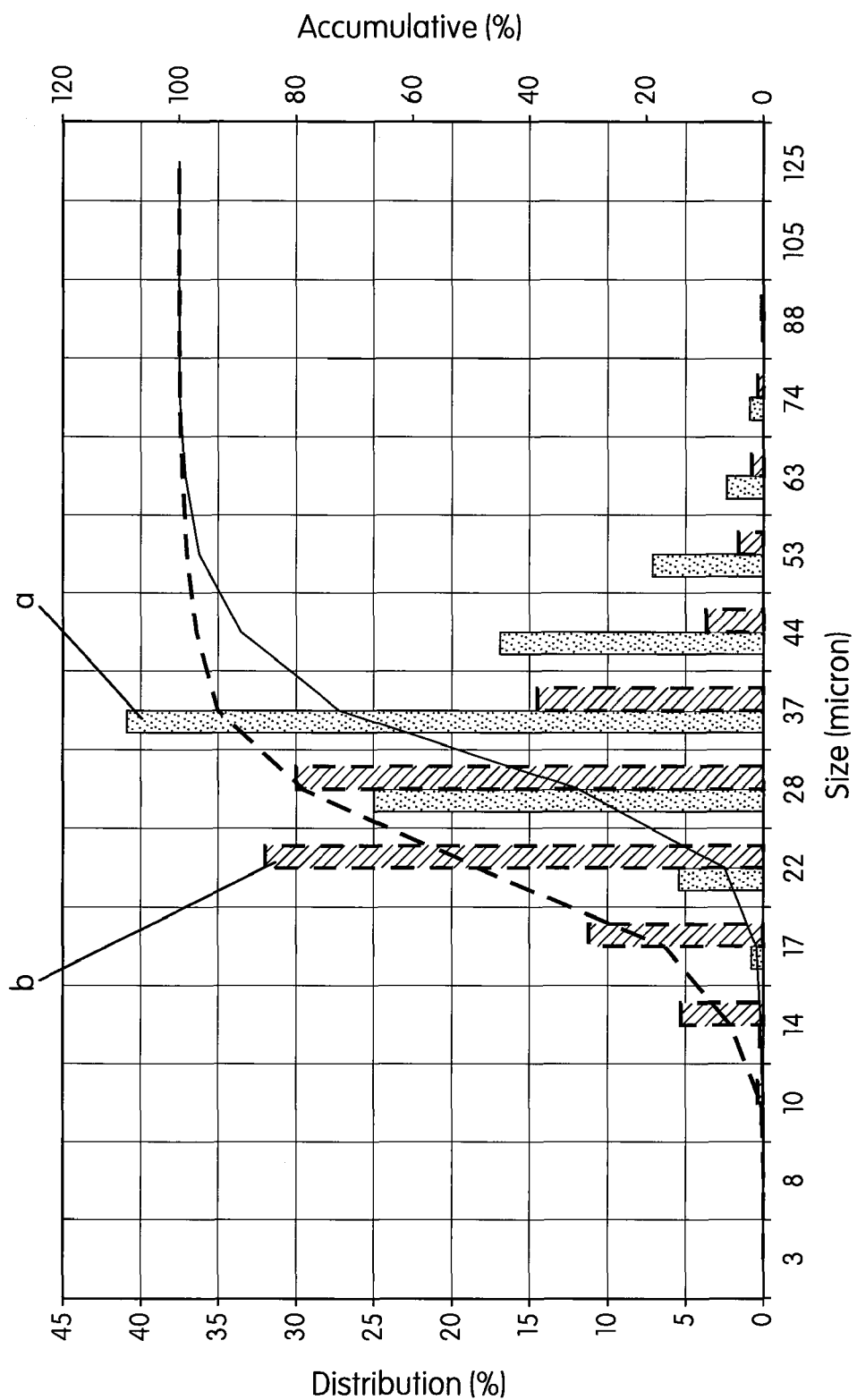
FIG. 9e shows laser size diffraction data for two types of powder (powder a and powder b) having the same chemical composition.

Referring to FIG. 9e, this figure shows laser size diffraction data for two types of powder (powder a and powder b) having the same chemical composition. Powder a has an apparent density of about 4.36 grams per cube centimeter and powder b has an apparent density of about 5.08 grams per cubic centimeter. While both powders a and b are very similar in size and morphology (powder b being marginally finer), a more uniform and resistant coating is obtained with powder a.

Figure 6A:
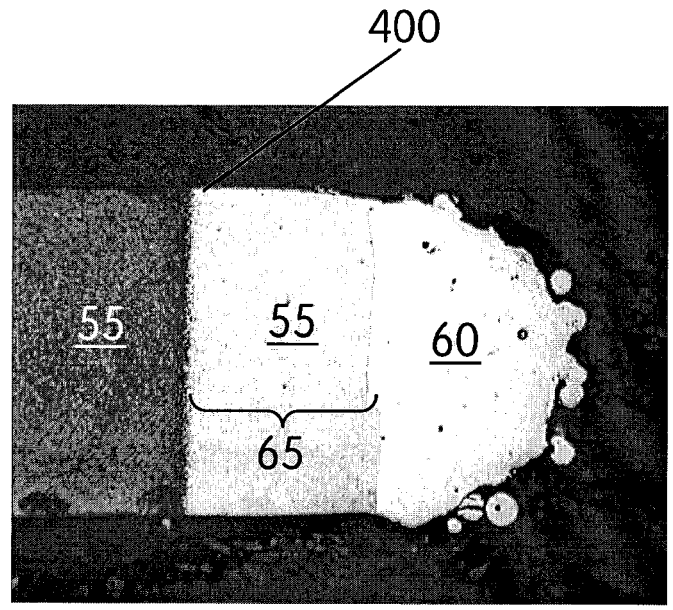
FIG. 6a shows a cross section microphotograph image of the blade after deposition of hard material and before grinding in accordance with an embodiment of the invention.
Figure 6B:
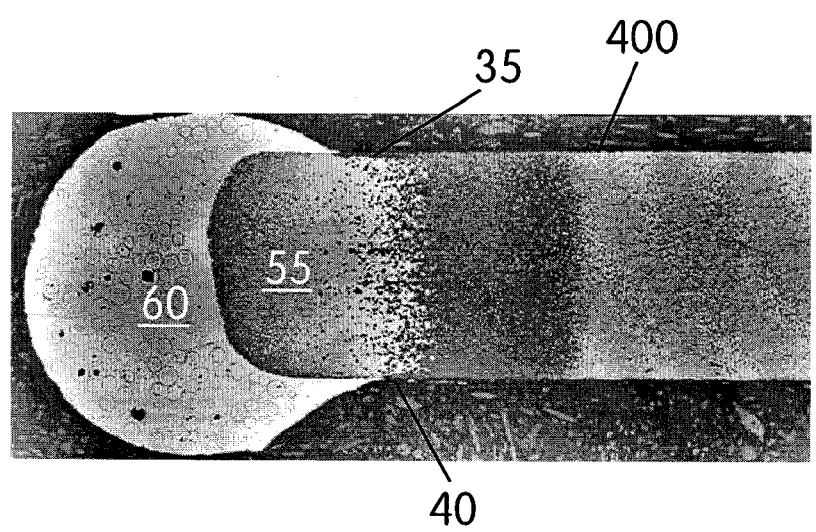
FIG. 6b shows a cross section microphotograph image of the blade after deposition of hard material and before grinding.
Figure 6C:
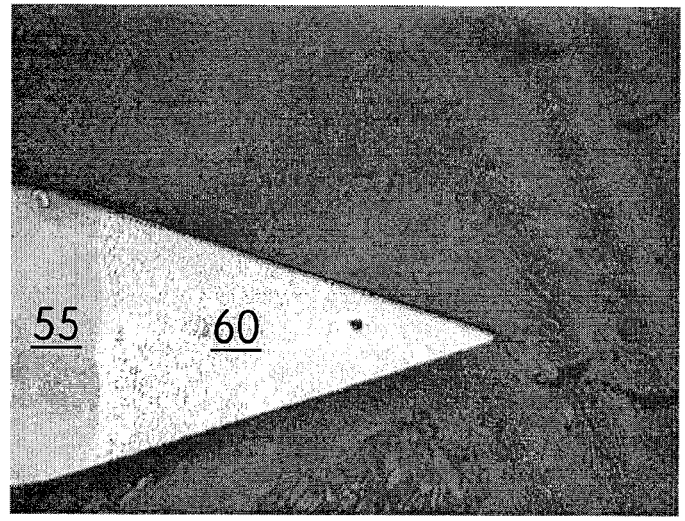
FIG. 6c shows a cross section microphotograph image of the blade after grinding the blade of FIG. 6a in accordance with an embodiment of the invention.
Figure 6D:
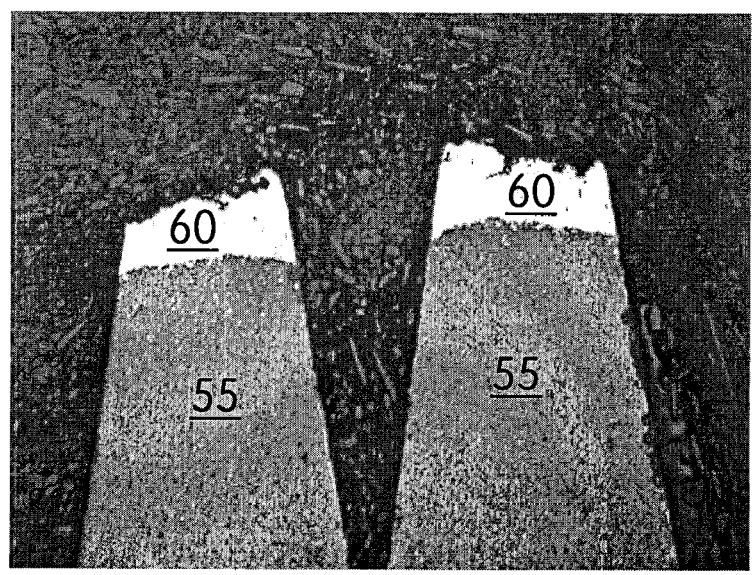
FIG. 6d shows a cross section microphotograph image of the blade after grinding the blade of FIG. 6b.

Referring to FIGS. 6a and 6b, these figures show two strips 400 of first material 55 on which a coating of second material 60 (tungsten carbide) has been deposited. FIGS. 6c and 6d show the blade 100 corresponding to the blades of FIGS. 6a and 6b, respectively, after grinding. In FIG. 6a, the size of the powder particles constituting the second material is less than about 1 micrometer. In FIG. 6b, the size of the powder particles constituting the second material is about 40 micrometers. As can be seen in FIG. 6b, because of the large particle size, the coating of second material 60 protrudes from the top and bottom portions 35, 40 of the blade 100. By contrast, in the coating of FIG. 6a, the deposit of second material 60 remains confined at the tip of the blade. The configuration of FIG. 6a is beneficial for grinding.

Figure 7:
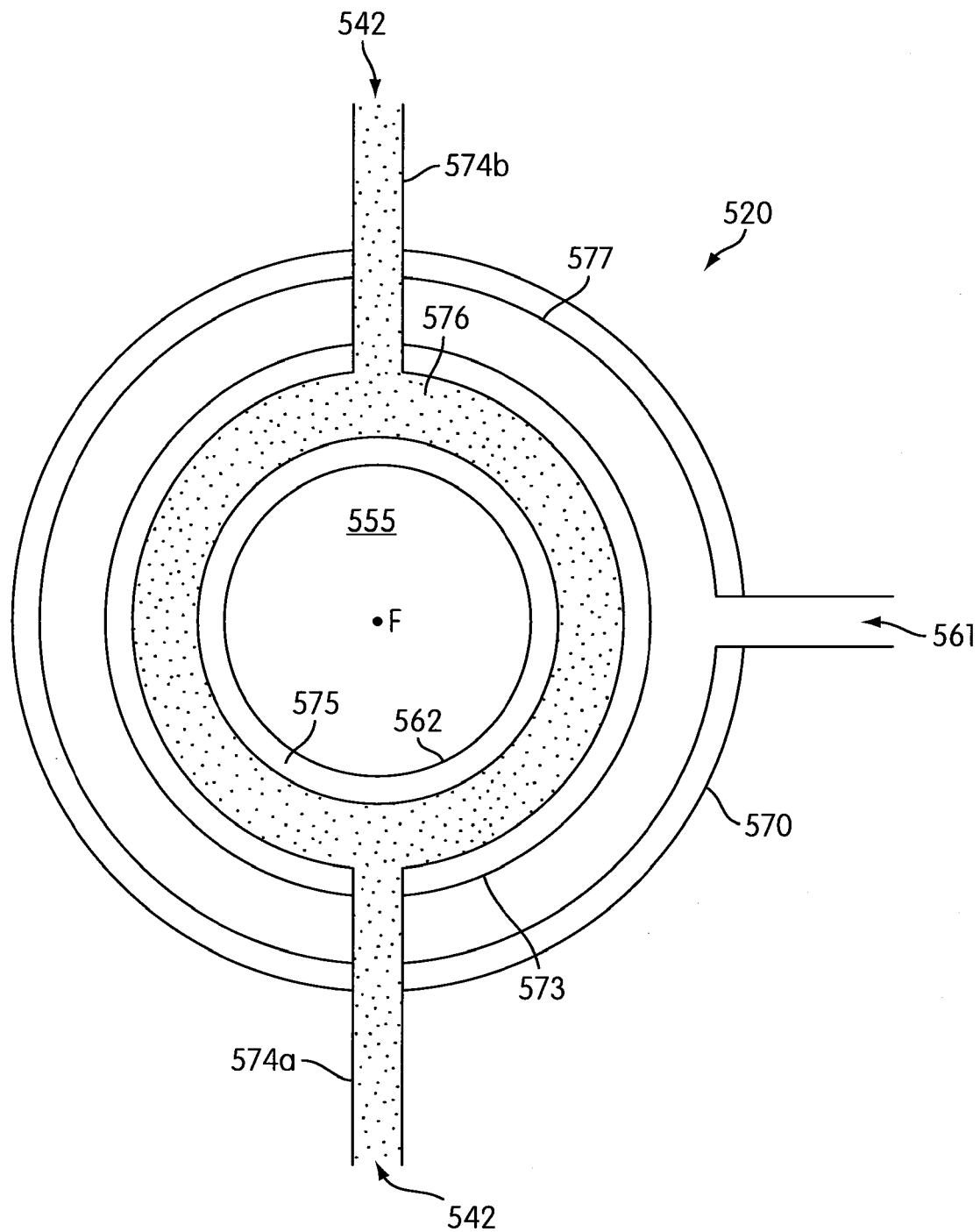
FIG. 7 shows a dispenser for use in the apparatus of FIG. 5 in accordance with an embodiment of the invention.

FIG. 7 shows a top view of the dispenser 520 in accordance with an embodiment of the invention. The dispenser 520 has a generally conical annular shape, although it is contemplated that other shapes (e.g. square, rectangular, oval, polygonal) could be used to dispense the mixture 542. The dispenser 520 includes a series of conical annular cavities designed to deliver the powder 542, inert shield gas 561 and laser beam to a single focus point F. In an embodiment of this invention, the shielding gas 561 is Argon. As shown in FIG. 7, the dispenser 520 includes an outer cone 570 and a gas inlet 571 through which the inert shield gas 561 is supplied. The dispenser 570 further includes an inner cone 573 and inlets 574a-b through which the mixture 542 is supplied. A central cone 575 defines a passage in the dispenser 520 to allow the projected radiation beam 555 to pass therethrough. The inner cone 573 is arranged between the central cone 575 and the outer cone 570 and defines a channel 576. The inner cone 573 and the outer cone 570 define a channel 577 therebetween to allow the inert shield gas 561 to flow therethrough. It will be appreciated that other arrangements are contemplated. It will also be appreciated that additional or fewer channels may be used to supply the mixture 542 to the strip 400.

The diameter of the periphery 562 of the central cone 575 is selected along with the distance D1 separating the dispenser 520 from the steel strip 400 and the length of the channel 576 such that the particles of the mixture 542 fall under the action of gravity onto a predetermined portion of the strip 400. Such predetermined portion generally corresponds to the point of focus F of the beam of radiation 555 onto the strip 400. The diameter of the inner periphery 562 is also selected in order to allow the radiation beam 555 to pass through the dispenser 520.

The inner shield gas 561 is configured to form a shield 546 around the mixture 542 at a location near the point of focus F, as shown in FIG. 5. The shield 546 provides a protective atmosphere during deposition of the mixture 542 of hard material (e.g. tungsten carbide) in order to prevent oxidation of the strip 400. During use of the deposition station 500, the inner shield gas 561 is flushed from the inlet 571 down the channel 577 to the strip in a manner that is such that the environment around the melted portion of the strip 400 is non-oxidizing.

The dispenser 520 is fixedly mounted to a frame (not shown) of deposition station 500 and may be either stationary or moveable in at least three directions, e.g. x, y and z directions. A benefit of having a moveable dispenser 520 is that the position of the dispenser 520 relative to the steel strip 500 can be accurately controlled. Various motors and actuators, such as electric, electromagnetic and/or piezoelectric actuators, could be used to displace the dispenser 520.

Supply of the mixture 542 to the dispenser 520 is effected via the plurality of inlets 574a-b. In one implementation, a container (not shown) is used to store the particles of mixture 542. The container is arranged to communicate with the plurality of inlets 574a-b via one or more conduits such that the mixture is conveyed to the predetermined portion of the strip 400 via the channel 576 under the action of gravity. In one embodiment of the invention, it is envisioned that the supply of the mixture 542 be mechanically assisted with, for example, a compressed gas or a mechanical pusher.

The dispenser 520 may also include one or more shutters (not shown) to prevent particles of mixture 542 from exiting the nozzles 560 after completing the deposition process. The shutters may be arranged on the inner periphery of the dispenser 520, or within the channels or on the upper portion of the dispenser.

Referring back to FIG. 5, the strip 400 may be moved in at least three directions, x, y and z, relative to the beam of radiation 555 with the aid of an actuator 535. As shown in FIG. 5, the movable strip 400 is moved under the radiation beam 555 along the x direction with the use of two rollers 544a-b. The two rollers 544a-b can be positioned with the actuator 535. One or more separate motors may be used to move the steel strip 200 in the at least three directions, x, y and z. Examples of actuators that may be used in an embodiment of the invention include electric and electromagnetic actuators. The position of the strip 400 may be controlled with the aid of dedicated electronics and servo control systems. To that effect, a measurement system (not shown) may be used to measure the position of the moving strip 400 under the radiation beam 555.

It will be appreciated that deposition of the mixture 542 of hard material (e.g. tungsten carbide) and binder element could be carried out in an unprotective environment. In this implementation, oxidation of the strip 400 will occur at the locations on the blade where the mixture 542 is deposited. The oxidation could then be mechanically or chemically removed after completing the deposition process. For example, it is contemplated that an in-line polishing process using a wire brushing be applied after deposition of the mixture 542 onto the strip 400.

An in-line measurement system 550 may be used to control the characteristics of the deposited mixture 542 onto the blade 100. Preferably, the measurement system 550 is a non-destructive optical system, such as an ellipsometer, that controls the quality/composition and thickness of the film mixture 542. The in-line measurement system 550 may include an emitter 551a and a detector 551b. The emitter 551a is configured to illuminate the portions of the strip 400 with a radiation beam. The radiation beam is reflected by the strip 400 and then detected by the detector 551b. The reflected radiation beam is subsequently analyzed with dedicated instrumentations in order to measure the characteristics of the coating of mixture 542. Preferably, the measurements are performed by the in-line measurement system 550 after completing the deposition process. If the measured characteristics of the strip 400 are not within specification, the portion of the steel strip can be marked with a marker to indicate that the final blade should be rejected.

As shown in FIG. 5, a controller 545 is used to control the deposition process. The controller 545 may be operatively connected to the dispenser 520, the radiation source 505 and the actuator 535. The controller 545 may be accessed by an operator to input the illumination settings, control the amount and flow of particles of the mixture 542 in the dispenser 520 and/or the desired positioning of the strip 400 during the deposition process. In the configuration where multiple deposition heads or nozzles are used, the operator can input to the controller 545 the desired composition in each deposition head. It will be appreciated that the positioning of the thin edge 17 of the strip 400 under the radiation beam 555, the amount of particles of mixture 542 and the illumination settings of the radiation source 505 may substantially change depending on the geometry and nature of the strip 400.

The binder element is selected to bind the hard material (e.g. tungsten carbide) to the melted material of the weld pool. All bonding between the particles of the mixture 542 and the strip 400 is achieved by solidification of the hard material (e.g. tungsten carbide)/binder element within the weld pool. This results in a void free deposit of hard material (e.g. tungsten carbide)/binder onto the strip 400. An example of binder that may be used in an embodiment of the invention includes cobalt. However, this is not limiting. It is contemplated that additional binders could be used in other embodiments of the invention.

The thickness of the deposit is controlled by the particle feed rate, the particle size, the illumination settings of the radiation source (e.g. energy, power, frequency of the radiation pulses) and the rate of passage of the strip 400 beneath the focused beam of radiation 555. These parameters are inputted and controlled by the controller 545. The thickness of the deposit is measured by the measurement device 551.

In operation, the thin edge 17 of the strip 400 is continuously moved under the radiation beam 555. It is desirable to carefully control the speed of displacement of the strip 400 such that the thickness of the deposit remains within specification at all times and to prevent the formation of voids in the deposit of the second material 60. The speed of the strip 400 may vary depending on the characteristics of the beam of radiation (e.g. wavelength and frequency, energy and power of the pulses), the size of the focus spot and the materials constituting the strip 400. In an embodiment, the size of the voids present in the coating of the second material is less than about 1% of the volume of the coating.

Figure 8A:
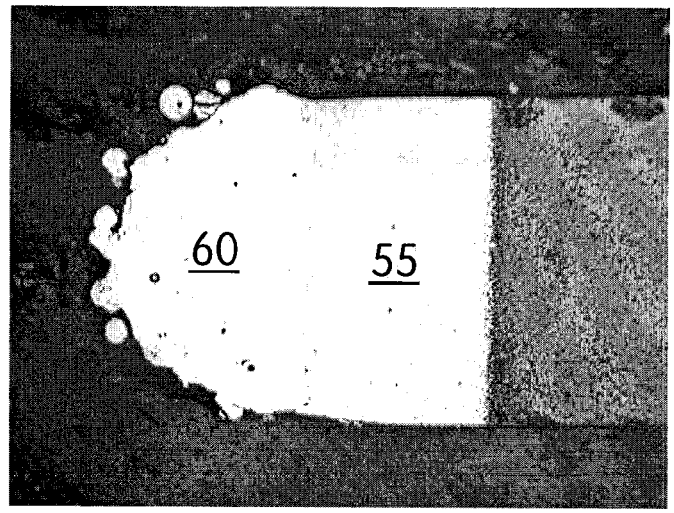
FIG. 8a shows a cross section microphotograph of the blade obtained for a 250 mm/minute deposit of second material in accordance with an embodiment of the invention.

For example, if the speed of the strip 400 is not controlled, the deposit of second material 60 may become undesirably porous. In one embodiment, the limiting throughput speed at which a minimum of 0.15 mm, such as about 0.3 mm, deposition thickness of second material can be achieved is about 200 mm/minute to 300 mm/minute, such as 250 mm/minute. FIG. 8a shows a cross section of the blade 100 obtained for a 250 mm/minute deposit of second material. Because of the very low heat penetration depth encountered with this technique there is little build-up of heat in the strip 400. As a result, the strip is self-quenching, and heat transfer into the body is sufficiently rapid to exceed the critical cooling rate for full hardening. A narrow band of untempered martensite, which corresponds to the intermediate portion 65 shown in FIG. 2a, forms immediately behind the deposited layer.

Figure 8B:
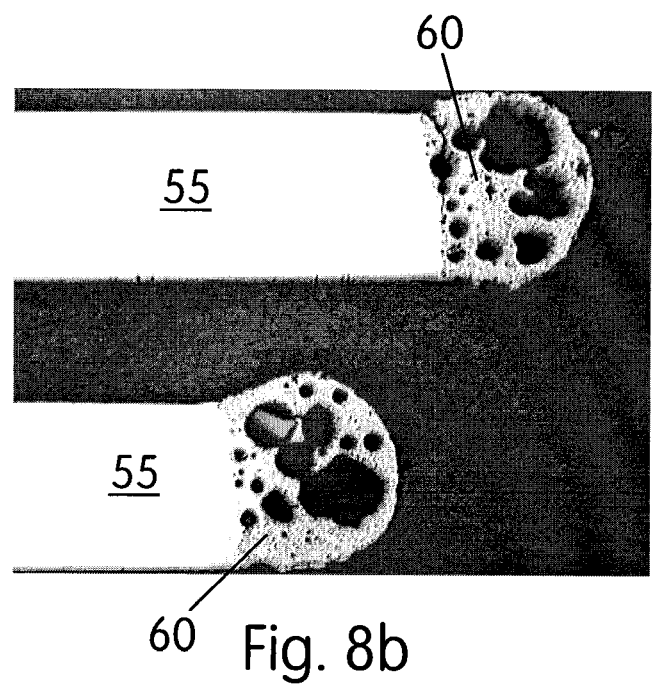
FIG. 8b shows a cross section microphotograph of the blade obtained for a deposit of second material at a speed greater than 250 mm/minute.
Figure 8C:
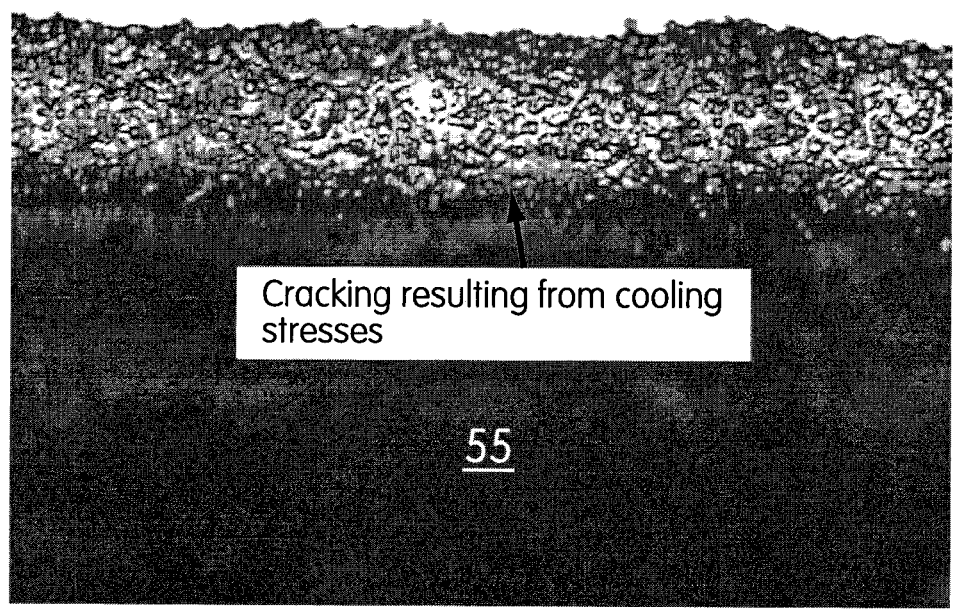
FIG. 8c shows a cross section microphotograph of the blade of FIG. 8b.

Increasing the line speed significantly beyond 250 mm/minute (e.g. beyond 700 mm/minute), while still depositing a minimum of 0.3 mm deposit thickness may create significant voids, as shown in FIG. 8b. In FIG. 8b, the speed of the strip is 1000 mm/minute. It has been found that, at higher processing speeds, the natural rate of cooling is high enough to result in cracking of the deposited layer, as shown in FIG. 8c. In one embodiment, the speed of the strip is less than 750 mm/minute. In another embodiment of the invention, the speed of the strip is less than 500 mm/minute.

Referring back to FIG. 3, after exiting the deposition station 500, the strip 400 is delivered to a grinding machine. In an embodiment, at step 391, the strip is recoiled and is transferred to a grinding machine for grinding an edge of the strip and forming the first facets 45a,b.

After grinding, at step 391, the edge of the strip 400 may be honed. The process of honing creates the second facets 50a,b and puts a second angle α' on top of the ground edge. This deeper honed angle gives a stronger edge than the more shallow ground angle and allows to extend the life span of the cutting edge. As a result the strip has an edge with a double angle. In another embodiment, only a single angle may be provided.

Finally, the processed steel strip is snapped along the length of the steel strip at each score line to break the steel strip along the score lines to produce a plurality of blades, at step 392.

A utility knife blade has been described in the foregoing embodiments. However, this is not limiting. It will be appreciated that other types of blades can be manufactured in a similar manner as a utility knife blade. Examples of blades that can be manufactured in accordance with the process described above include TK blades, razor blades, carpet blades, scrapper blades, saw blades, hacksaw blades, and recip blades.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A manufactured blade for a cutting tool comprising:
a portion made of a first material and having a hardness in a range from 500 Hv to 700 Hv; and
an elongated portion made of the first material and a second material, the second material being harder than the first material and deposited on the first material and having a hardness greater than 1,100 Hv, the elongated portion forming the tip of the blade,
wherein the elongated portion forms a facet of the blade that is oriented at a non-zero angle relative to a surface of the portion of the blade,
wherein the second material includes tungsten carbide particles that have a size less than 5 micrometers, and
wherein a transition from the surface of the portion of the blade to the facet of the elongated portion occurs in a region of the blade made only of the first material that has been re-hardened during deposition of the second material on the first material.

2. The blade of claim 1, wherein the size of the tungsten carbide particles is less than 2 micrometers.

3. A manufactured blade for a cutting tool comprising:
a first elongated portion made of a first material; and
a second elongated portion made of the first material and a second material, the second material being harder than the first material and deposited on the first material, the second elongated portion forming the tip of the blade,
wherein the first elongated portion defines a first cutting edge having a first angle and the second elongated portion defines a second cutting edge having a second angle, the first angle being smaller than the second angle, and
wherein a transition from the first angle to the second angle occurs in a region of the blade made only of the first material that has been re-hardened during deposition of the second material on the first material.

4. The blade of claim 3, wherein said region has a hardness lower than a hardness of the second material but greater than a hardness of the first material.

5. The blade of claim 4, wherein the hardness of the second material is greater than 1,100 Hv.

6. The blade of claim 4, wherein the hardness of the first material is in a range from 500 Hv to 700 Hv.

7. The blade of claim 6, wherein the hardness of the first material is in a range from 630 Hv to 650 Hv.

8. The blade of claim 3, wherein a thickness of the second material along a cross section of said blade is in a range from 0.1 mm to 0.3 mm.

9. The blade of claim 3, wherein a thickness of said region along a cross section of said blade is in a range from 0.3 mm to 0.4 mm.

10. The blade of claim 3, wherein the second material occupies a volume greater than 50% of a total volume of the second elongated portion.

11. The blade of claim 3, wherein the second material occupies a volume greater than 70% of a total volume of the second elongated portion.

12. The blade of claim 3, wherein the second material is tungsten carbide.

13. The blade of claim 12, wherein a size of tungsten carbide particles is less than 2 micrometers.

14. The blade of claim 12, wherein the second material includes a mixture of cobalt, chromium, carbon and tungsten.

15. The blade of claim 14, wherein the cobalt is in a range of from 9.5 to 10.5 by weight of the second material, the chromium is in a range of a from 3.5% to 4.5% by weight of the second material and the carbon is in a range of a from 5% to 5.5% by weight of the second material.

16. The blade of claim 3, wherein the first material is steel.

17. The blade of claim 3, wherein voids in the second material represent less than 1% of a total volume, of the second material.

18. The blade of claim 3, wherein the region comprising the re-hardened first material, in which the transition occurs, extends in both the first elongated portion and the second elongated portion.

19. A manufactured blade for a cutting tool comprising:
a portion made of a first material; and
an elongated portion made of the first material and a second material, the second material being harder than the first material and deposited on the first material, the elongated portion forming the tip of the blade,
wherein the elongated portion forms a facet of the blade that is oriented at a non-zero angle relative to a surface of the portion of the blade, and
wherein a transition from the surface of the portion to the facet of the elongated portion occurs in a region of the blade made only of the first material that has been re-hardened during deposition of the second material on the first material.

20. The blade of claim 19, wherein said region has a hardness lower than a hardness of the second material but greater than a hardness of the first material.

21. The blade of claim 20, wherein the hardness of the second material is greater than 1,100 Hv.

22. The blade of claim 20, wherein the hardness of the first material is in a range from 500 Hv to 700 Hv.

23. The blade of claim 22, wherein the hardness of the first material is in a range from 630 Hv to 650 Hv.

24. The blade of claim 22, wherein the second material is tungsten carbide.

25. The blade of claim 19, wherein the region comprising the re-hardened first material, in which the transition occurs, extends in both the portion and the elongated portion.

* * * * *